(12) United States Patent
Aitken

(10) Patent No.: US 8,084,380 B2
(45) Date of Patent: Dec. 27, 2011

(54) TRANSITION METAL DOPED SN PHOSPHATE GLASS

(75) Inventor: Bruce Gardiner Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 230 days.

(21) Appl. No.: 12/394,269

(22) Filed: Feb. 27, 2009

(65) Prior Publication Data

US 2010/0222197 A1 Sep. 2, 2010

(51) Int. Cl.
*C03C 3/16* (2006.01)
*C03C 3/21* (2006.01)
*C03C 8/00* (2006.01)
*C03C 8/02* (2006.01)

(52) U.S. Cl. .............. 501/45; 501/46; 501/14; 501/15; 501/21; 501/24; 501/26

(58) Field of Classification Search ............ 501/21, 501/24, 26, 45, 46, 14, 15
See application file for complete search history.

(56) References Cited

U.S. PATENT DOCUMENTS

| | | | | |
|---|---|---|---|---|
| 2,400,147 A | 5/1946 | Hooley | ............. | 252/301.6 |
| 3,407,091 A | 10/1968 | Busdiecker | ............. | 117/129 |
| 4,314,031 A | 2/1982 | Sanford et al. | ............. | 501/44 |
| 4,940,677 A | 7/1990 | Beall et al. | ............. | 501/45 |
| 5,021,366 A | 6/1991 | Aitken | ............. | 501/45 |
| 5,071,795 A | 12/1991 | Beall et al. | ............. | 501/44 |
| 5,089,445 A | 2/1992 | Francis | ............. | 501/15 |
| 5,089,446 A * | 2/1992 | Cornelius et al. | ............. | 501/15 |
| 5,246,890 A * | 9/1993 | Aitken et al. | ............. | 501/15 |
| 5,880,045 A * | 3/1999 | Cao et al. | ............. | 501/73 |
| 6,309,989 B1 * | 10/2001 | Kikutani | ............. | 501/15 |
| 6,617,269 B2 * | 9/2003 | Yamanaka | ............. | 501/24 |
| 6,989,340 B2 * | 1/2006 | Masuda | ............. | 501/45 |
| 6,998,776 B2 * | 2/2006 | Aitken et al. | ............. | 313/512 |
| 7,615,506 B2 * | 11/2009 | Aitken et al. | ............. | 501/44 |
| 2002/0019303 A1* | 2/2002 | Yamanaka | ............. | 501/17 |
| 2007/0040501 A1* | 2/2007 | Aitken et al. | ............. | 313/512 |
| 2008/0058193 A1* | 3/2008 | Drake et al. | ............. | 501/15 |

FOREIGN PATENT DOCUMENTS

| | | | | |
|---|---|---|---|---|
| JP | 09235136 | | | 9/1997 |
| JP | 09235136 A | * | | 9/1997 |
| JP | 2001010843 A | * | | 1/2001 |
| JP | 2001019472 A | * | | 1/2001 |
| JP | 2001-064524 | | | 3/2001 |
| JP | 2002160937 A | * | | 6/2002 |
| JP | 2003146691 A | * | | 5/2003 |
| JP | 2004059366 A | * | | 2/2004 |
| JP | 2004067406 A | * | | 3/2004 |
| JP | 2004-217516 | | | 8/2004 |
| JP | 2005132650 A | * | | 5/2005 |
| JP | 2008037740 A | * | | 2/2008 |
| WO | WO 2004050577 A1 | * | | 6/2004 |
| WO | WO2008/007504 | | | 1/2008 |

* cited by examiner

*Primary Examiner* — Karl Group
*Assistant Examiner* — Elizabeth A Bolden
(74) *Attorney, Agent, or Firm* — Tina N. Thompson

(57) ABSTRACT

Transition metal doped Sn phosphate glass compositions and methods of making transition metal doped Sn phosphate glass compositions are described which can be used for example, in sealing applications.

16 Claims, No Drawings

TRANSITION METAL DOPED SN PHOSPHATE GLASS

BACKGROUND

1. Field of the Invention

Embodiments relate to transition metal doped Sn phosphate glass compositions and methods of making transition metal doped Sn phosphate glass compositions, and more particularly to transition metal doped Sn phosphate glasses useful for, for example, as sealing glasses.

2. Technical Background

Chemically durable, low temperature glasses are useful, for example, as frits or glasses in sealing applications. Lead-containing borate and borosilicate glasses have been the traditional materials for such applications. However, in view of the increasing demand for environmentally friendly materials, lead-free glasses having similar durability and sealing temperatures as the conventional glasses have become desirable. Several types of lead-free phosphate glasses for use as environmentally friendly or "green" frits, for example, SnZn and VSb phosphate glasses have previously been developed.

In order to have maximum flexibility in tailoring a potential sealing glass for a specific application, it would be advantageous to have as wide a range as possible of available glass compositions for sealing applications so that, for example, the thermal expansion coefficient or the softening point can be chosen for instance to match a particular substrate without compromising chemical durability. Further, it would be advantageous for such glass compositions to be lead-free.

Glass compositions, as described herein, address one or more of the above-mentioned disadvantages of conventional glass compositions useful for sealing applications and provide one or more of the following advantages: significant expansion of the glass forming region of "green" sealing glasses allows for greater flexibility in tailoring other glass properties, such as characteristic temperatures, thermal expansion coefficient, and/or refractive index that may be advantageous for specific applications, especially when an exact match with a particular substrate's properties is needed. The transition metal additives, for example, Ti, V, Fe, and/or Nb, may provide the additional benefit that, while they can enable further tailoring of properties such as thermal expansion, this tailorability may be achieved without sacrificing the desirable low characteristic temperature typically found in conventional SnZn phosphate glasses One embodiment is a glass composition comprising in mole percent:
  40 to 80 percent SnO;
  12 to 35 percent $P_2O_5$;
  0 to 15 percent ZnO; and
  greater than 0 to 40 percent metal oxide, wherein the metal oxide is selected from titanium oxide, vanadium oxide, iron oxide, niobium oxide, and combinations thereof and
  wherein when ZnO is present in an amount of 6 percent or more, and when the metal oxide is titanium oxide, niobium oxide, or a combination thereof, then titanium oxide, niobium oxide, or a combination thereof is present in an amount greater than 5 percent.

Another embodiment is a glass composition consisting essentially of in mole percent:
  40 to 80 percent SnO;
  12 to 35 percent $P_2O_5$;
  0 to 15 percent ZnO; and
  greater than 0 to 40 percent metal oxide, wherein the metal oxide is selected from titanium oxide, vanadium oxide, iron oxide, niobium oxide, and combinations thereof and
  wherein when ZnO is present in an amount of 6 percent or more, and when the metal oxide is titanium oxide, niobium oxide, or a combination thereof, then titanium oxide, niobium oxide, or a combination thereof is present in an amount greater than 5 percent.

Another embodiment is a glass composition comprising in mole percent:
  40 to 80 percent SnO;
  12 to less than 25 percent $P_2O_5$;
  0 to 15 percent ZnO; and
  greater than 0 to 40 percent metal oxide, wherein the metal oxide is selected from titanium oxide, vanadium oxide, iron oxide, niobium oxide, and combinations thereof.

Another embodiment is a glass composition consisting essentially of in mole percent:
  40 to 80 percent SnO;
  12 to less than 25 percent $P_2O_5$;
  0 to 15 percent ZnO; and
  greater than 0 to 40 percent metal oxide, wherein the metal oxide is selected from titanium oxide, vanadium oxide, iron oxide, niobium oxide, and combinations thereof.

Additional features and advantages of the invention will be set forth in the detailed description which follows, and in part will be readily apparent to those skilled in the art from the description or recognized by practicing the invention as described in the written description and claims hereof.

It is to be understood that both the foregoing general description and the following detailed description are merely exemplary of the invention, and are intended to provide an overview or framework for understanding the nature and character of the invention as it is claimed.

DETAILED DESCRIPTION

Reference will now be made in detail to various embodiments of the invention.

One embodiment is a glass composition comprising in mole percent:
  40 to 80 percent SnO;
  12 to 35 percent $P_2O_5$;
  0 to 15 percent ZnO; and
  greater than 0 to 40 percent metal oxide, wherein the metal oxide is selected from titanium oxide, vanadium oxide, iron oxide, niobium oxide, and combinations thereof and
  wherein when ZnO is present in an amount of 6 percent or more, and when the metal oxide is titanium oxide, niobium oxide, or a combination thereof, then titanium oxide, niobium oxide, or a combination thereof is present in an amount greater than 5 percent.

The mole percents of the components of the glass compositions described herein are calculated on an oxide basis.

The glass composition, in some embodiments, comprises SnO in mole percent in any value including decimals in the range of from 40 to 80 percent, for example, from 50 to 80 percent SnO, for instance from 51.3 to 79.2.

In some embodiments, the glass composition comprises $P_2O_5$ in mole percent in any value including decimals in the range of from 12 to 35 percent, for example, from 15 to 30 percent $P_2O_5$, for example, from 16.5 to 29.9 for instance from 17 to 28.8 percent.

In some embodiments, the glass composition comprises ZnO in mole percent in any value including decimals in the range of from 0 to 15 percent. In one embodiment, the ZnO content is 0 percent. In another embodiment, the ZnO content is greater than 0 percent.

In some embodiments, the glass composition comprises metal oxide in mole percent in any value including decimals in the range of from greater than 0 to 40 percent, for example, up to 30 percent metal oxide, for example, from 0.1 to 30 percent. According to another embodiment, the glass composition comprises 1 to 40 percent metal oxide for instance 1 to 30 percent. The metal oxide is selected from titanium oxide, vanadium oxide, iron oxide, niobium oxide, and combinations thereof and when ZnO is present in an amount of 6 percent or more, and when the metal oxide is titanium oxide, niobium oxide, or a combination thereof, then titanium oxide, niobium oxide, or a combination thereof is present in an amount greater than 5 percent.

According to one embodiment, the metal oxide is titanium oxide or vanadium oxide or iron oxide or niobium oxide. In other embodiments, the glass composition comprises combinations of two or more of titanium oxide, vanadium oxide, iron oxide, and/or niobium oxide.

Another embodiment is a glass composition consisting essentially of in mole percent:

40 to 80 percent SnO;

12 to 35 percent $P_2O_5$;

0 to 15 percent ZnO; and greater than 0 to 40 percent metal oxide, wherein the metal oxide is selected from titanium oxide, vanadium oxide, iron oxide, niobium oxide, and combinations thereof and wherein when ZnO is present in an amount of 6 percent or more, and when the metal oxide is titanium oxide, niobium oxide, or a combination thereof, then titanium oxide, niobium oxide, or a combination thereof is present in an amount greater than 5 percent.

The ranges of components in the glass composition comprise in mole percent any value including decimals in the range, for example, the range for metal oxide includes 1 to 40 percent metal oxide for instance 1 to 30 percent, for example 1.1 to 28.9 percent.

Another embodiment is a glass composition comprising in mole percent:

40 to 80 percent SnO;

12 to less than 25 percent $P_2O_5$;

0 to 15 percent ZnO; and greater than 0 to 40 percent metal oxide, wherein the metal oxide is selected from titanium oxide, vanadium oxide, iron oxide, niobium oxide, and combinations thereof.

The ranges of components in the glass composition comprise in mole percent any value including decimals in the range, for example, the range for metal oxide includes 1 to 40 percent metal oxide for instance 1 to 30 percent, for example 1.1 to 28.9 percent.

Another embodiment is a glass composition consisting essentially of in mole percent:

40 to 80 percent SnO;

12 to less than 25 percent $P_2O_5$;

0 to 15 percent ZnO; and greater than 0 to 40 percent metal oxide, wherein the metal oxide is selected from titanium oxide, vanadium oxide, iron oxide, niobium oxide, and combinations thereof.

The ranges of components in the glass composition comprise in mole percent any value including decimals in the range, for example, the range for metal oxide includes 1 to 40 percent metal oxide for instance 1 to 30 percent, for example 1.1 to 28.9 percent.

According to one embodiment, the glass transition temperature of the glass is 400 degrees Celsius (° C.) or less, for example, 370° C. or less. In another embodiment, the glass transition temperature of the glass is in the range of from 270° C. to 370° C. The glass transition temperature ($T_g$) of these glass compositions indicate likely sealing temperatures in sealing applications in the range of from 350° C. to 425° C.

Moreover, considering the excellent water durability of Ti, V, Fe and Nb oxides, the inventive transition metal Sn phosphate glasses are as durable or more durable than their SnZn analogues.

One embodiment is an article comprising any one of the glass compositions described herein. The article can comprise more than one of the glass compositions described herein. The article can be an organic light emitting diode (OLED), an optical component, a lighting device, a telecommunication device, a flat panel display device, or a liquid crystal display device. Another embodiment is a glass frit or sealing glass comprising one or more of the glass compositions described herein. The glass frit or sealing glass can be used in, for example, an OLED, an optical component, a lighting device, a telecommunication device, a flat panel display device, or a liquid crystal display device. Glass frits can be made from the described glass compositions using methods known by those skilled in the art.

One embodiment is a method of making the glass compositions disclosed herein, the method comprises combining batch materials, wherein the batch materials comprise oxides having reduced oxidation states; and melting the batch materials to form the glass composition. The method, according to one embodiment, further comprises melting the glass in an inert or reducing environment. An inert such as nitrogen or argon, and a reducing gas such as forming gas or combinations thereof can be used to provide the inert or reducing environment.

Glass formation according to one embodiment is enhanced by using reduced batch materials, for example, batch materials in which Ti and Fe are present in the trivalent and divalent state, respectively. Thus, $Ti_2O_3$ can be used as a source of Ti, and Fe oxalate and/or FeO can be used as sources of Fe. Also, ammonium dihydrogen phosphate and/or diammonium hydrogen phosphate can be used as a source of P. Using components in their reduced oxidation states help to promote glass formation and promote the formation of glasses having low glass transition temperatures. Using components in their reduced oxidation states can help to maintain a reducing environment during melting. In particular, for the described glass compositions comprising SnO, using other components in their reduced oxidation states minimizes the oxidation of $Sn^{2+}$ to $Sn^{4+}$ during melting,

EXAMPLES

Exemplary glass compositions as described herein were prepared by melting 500 gram batches of turbula-mixed oxide powders in covered silica crucibles at a temperature in the range of from 700° C. to 1000° C. Temperatures in the range of from 800° C. to 850° C. can be used to melt the batch materials.

Exemplary glass compositions are shown in Table 1, Table 2, Table 3, and Table 4. Table 1 shows exemplary glass compositions 1 through 8. Table 2 shows exemplary glass compositions 9 through 11. Table 3 shows exemplary glass compositions 12 through 20. Table 4 shows exemplary glass compositions 21 through 28.

In each Table, the first group of rows expresses the glass composition in mole percents. The second group of rows expresses the glass composition in weight percents. The actual batch components in grams (g) are shown in each Table in the third group of rows. The exemplary glass compositions in Table 1 illustrate glass formation in the ternary $TiO_2$—$SnO$—$P_2O_5$ system and glass formation in the $FeO±V_2O_5±Nb_2O_5$—$SnO$—$P_2O_5$ system. The exemplary glass compositions in Table 2 illustrate glass formation in the ternary $TiO_2$—$SnO$—$P_2O_5$ system. The exemplary glass compositions in Table 3 illustrate glass formation in the $FeO±TiO_2±ZnO$—$SnO$—$P_2O_5$ system. The exemplary glass compositions in Table 4 illustrate glass formation in the $FeO±TiO_2±ZnO$—$SnO$—$P_2O_5$ system. Glass transition temperatures ($T_g$) were measured by Differential Scanning Calorimetry (DSC) and thermal expansion coefficients ($\alpha$) were determined by dilatometry.

Samples of exemplary glass compositions were weighed, and the visual appearances of the samples were observed and are shown in the Tables. The exemplary glass compositions shown in Table 1 were then subjected to durability testing at 85° C. at 85% relative humidity for 1000 hours. The samples were then weighed and the visual appearances were again observed and are shown in Table 1. The glass compositions tested were able to withstand the harsh 85/85 testing environment with little or no change in weights or appearances.

TABLE 1

| | Example | | | | | | | |
|---|---|---|---|---|---|---|---|---|
| | 1 | 2 | 3 | 4 | 5 | 6 | 7 | 8 |
| mol % | | | | | | | | |
| SnO | 70.0 | 72.5 | 70.7 | 72.5 | 77.5 | 65.0 | 63.6 | 59.1 |
| $TiO_2$ | 5.0 | — | — | — | 5.0 | 10.0 | — | — |
| FeO | — | — | 4.88 | — | — | — | 18.2 | 18.2 |
| $V_2O_5$ | — | 2.5 | — | — | — | — | — | — |
| $Nb_2O5$ | — | — | — | 2.5 | — | — | — | — |
| $P_2O_5$ | 25.0 | 25.0 | 24.4 | 25.0 | 17.5 | 25.0 | 18.2 | 22.7 |
| wt % | | | | | | | | |
| SnO | 70.7 | 71.2 | 71.4 | 70.1 | 78.5 | 67.1 | 68.3 | 63.3 |
| $TiO_2$ | 2.96 | — | — | — | 2.96 | 6.03 | — | — |
| $Fe_2O_3$ | — | — | 2.88 | — | — | — | 11.4 | 11.4 |
| $V_2O_5$ | — | 3.27 | — | — | — | — | — | — |
| $Nb_2O_5$ | — | — | — | 4.70 | — | — | — | — |
| $P_2O_5$ | 26.2 | 25.5 | 25.6 | 25.1 | 18.4 | 26.8 | 20.3 | 25.3 |
| batch (g) | | | | | | | | |
| SnO | 360 | 363 | 364 | 357 | 400 | 342 | 348 | 322 |
| $Ti_2O_3$ | 13.3 | — | — | — | 13.3 | 27.2 | — | — |
| Fe oxalate | — | — | 32.4 | — | — | — | 129 | 129 |
| $V_2O_5$ | — | 16.4 | — | — | — | — | — | — |
| $Nb_2O_5$ | — | — | — | 23.6 | — | — | — | — |
| $NH_4H_2PO_4$ | 214 | 208 | 209 | 205 | 151 | 219 | 166 | 207 |
| appearance | dk brn glass | transluc dk grn glass | olive glass | olive grn opal | brn orge glass | black glass | brown glass | brown glass |
| $T_g$ (° C.) | 307 | 294 | 292 | 302 | 316 | 337 | 335 | 332 |
| CTE (RT-250° C.) | 127 | — | 131 | — | 123 | 111 | 109 | 111 |
| % wt loss (85/85) | 0 | 0 | 0.03 | 0 | 0 | — | 0 | 0 |
| appearance change (85/85) | none | none | none | none | none | — | none | none |

TABLE 2

| | Example | | |
|---|---|---|---|
| | 9 | 10 | 11 |
| mol % | | | |
| SnO | 60.0 | 60.0 | 50.0 |
| $TiO_2$ | 15.0 | 20.0 | 30.0 |
| FeO | — | — | — |
| $V_2O_5$ | — | — | — |
| $Nb_2O_5$ | — | — | — |
| $P_2O_5$ | 25.0 | 20.0 | 20.0 |
| wt % | | | |
| SnO | 63.3 | 64.8 | 56.6 |
| $TiO_2$ | 9.25 | 12.6 | 19.8 |
| $Fe_2O_3$ | — | — | — |
| $V_2O_5$ | — | — | — |
| $Nb_2O_5$ | — | — | — |
| $P_2O_5$ | 27.4 | 22.4 | 23.5 |
| batch (g) | | | |
| SnO | 258 | 264 | 231 |
| $Ti_2O_3$ | 33.3 | 45.5 | 71.5 |
| Fe oxalate | — | — | — |
| $V_2O_5$ | — | — | — |
| $Nb_2O_5$ | — | — | — |
| $NH_4H_2PO_4$ | 179 | 147 | 154 |
| appearance | black glass | black glass | black glass |
| $T_g$ (° C.) | 366 | | |

TABLE 3

| | Example | | | | | | | | |
|---|---|---|---|---|---|---|---|---|---|
| | 12 | 13 | 14 | 15 | 16 | 17 | 18 | 19 | 20 |
| mol % | | | | | | | | | |
| SnO | 72.5 | 70 | 67.5 | 65 | 69.1 | 66.7 | 64.3 | 61.9 | 70.7 |
| $TiO_2$ | 5.0 | 5.0 | 5.0 | 5.0 | — | — | — | — | 4.9 |
| FeO | — | — | — | — | 9.5 | 9.5 | 9.5 | 9.5 | 4.9 |
| ZnO | 2.5 | 5.0 | 2.5 | 5.0 | 2.4 | 4.8 | 2.4 | 4.8 | — |
| $P_2O_5$ | 20.0 | 20.0 | 25.0 | 25.0 | 19.1 | 19.1 | 23.8 | 23.8 | 19.5 |
| wt % | | | | | | | | | |
| SnO | 74.1 | 72.3 | 68.9 | 67.0 | 72.0 | 70.2 | 66.9 | 65.1 | 73.1 |
| $TiO_2$ | 2.99 | 3.02 | 2.99 | 3.02 | — | — | — | — | 2.95 |
| $Fe_2O_3$ | — | — | — | — | 5.80 | 5.86 | 5.79 | 5.85 | 2.95 |
| ZnO | 1.52 | 3.08 | 1.52 | 3.07 | 1.48 | 2.99 | 1.48 | 2.98 | — |
| $P_2O_5$ | 21.2 | 21.5 | 26.5 | 26.8 | 20.6 | 20.8 | 25.7 | 26.0 | 20.9 |
| batch (g) | | | | | | | | | |
| SnO | 378 | 369 | 351 | 342 | 367 | 358 | 341 | 332 | 372 |
| $Ti_2O_3$ | 13.5 | 13.6 | 13.5 | 13.6 | — | — | — | — | 13.3 |
| Fe oxalate | — | — | — | — | 65.6 | 66.3 | 65.5 | 66.1 | 33.2 |
| ZnO | 7.61 | 15.4 | 7.61 | 15.4 | 7.41 | 15.0 | 7.41 | 14.9 | — |
| $NH_4H_2PO_4$ | 174 | 175 | 217 | 219 | 169 | 170 | 210 | 213 | 171 |
| appearance | olive glass | olive glass | v dk brown glass | orange amber glass | yellow brown glass | yellow brown glass | transluc brn glass | transluc brn glass | amber glass |
| $T_g$ (° C.) | 303 | 306 | 302 | 311 | 318 | 320 | 304 | 302 | 305 |

TABLE 4

| | Example | | | | | | | |
|---|---|---|---|---|---|---|---|---|
| | 21 | 22 | 23 | 24 | 25 | 26 | 27 | 28 |
| mol % | | | | | | | | |
| SnO | 70.0 | 67.5 | 65.0 | 65.0 | 70.7 | 68.3 | 65.9 | 65.9 |
| $TiO_2$ | 5.0 | 5.0 | 5.0 | 10.0 | — | — | — | 4.9 |
| FeO | — | — | — | — | 4.9 | 4.9 | 4.9 | 4.9 |
| ZnO | 5.0 | 7.5 | 10.0 | 5.0 | 4.9 | 7.3 | 9.8 | 4.9 |
| $P_2O_5$ | 20.0 | 20.0 | 20.0 | 20.0 | 19.5 | 19.5 | 19.5 | 19.5 |
| wt % | | | | | | | | |
| SnO | 72.3 | 70.5 | 68.6 | 68.6 | 73.0 | 71.2 | 69.4 | 69.5 |
| $TiO_2$ | 3.02 | 3.06 | 3.09 | 6.17 | — | — | — | 3.01 |
| $Fe_2O_3$ | — | — | — | — | 2.95 | 2.98 | 3.01 | 3.01 |
| ZnO | 3.08 | 4.66 | 6.28 | 3.15 | 3.00 | 4.54 | 6.12 | 3.07 |
| $P_2O_5$ | 21.5 | 21.7 | 21.9 | 21.9 | 20.9 | 21.1 | 21.4 | 21.4 |
| batch (g) | | | | | | | | |
| SnO | 369 | 359 | 350 | 350 | 372 | 363 | 354 | 354 |
| $Ti_2O_3$ | 13.6 | 13.8 | 13.9 | 27.8 | — | — | — | 13.5 |
| Fe oxalate | — | — | — | — | 33.2 | 33.5 | 33.9 | 33.9 |
| ZnO | 15.4 | 23.4 | 31.5 | 15.8 | 15.0 | 22.8 | 30.7 | 15.4 |
| $NH_4H_2PO_4$ | 175 | 177 | 179 | 179 | 171 | 173 | 175 | 175 |
| appearance | orange brown glass | orange brown glass | orange brown glass | transluc brown glass | yellow brown glass | yellow brown glass | yellow brown glass | dk red brown glass |
| $T_g$ (° C.) | 319 | 325 | 323 | 319 | 311 | 320 | 322 | 331 |

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A glass composition comprising in mole percent:
   40 to 80 percent SnO;
   12 to 35 percent $P_2O_5$;
   0 to 15 percent ZnO; and
   1 to 40 percent iron oxide.

2. The glass composition according to claim 1, comprising 0 percent ZnO.

3. The glass composition according to claim 1, comprising greater than 0 percent ZnO.

4. The glass composition according to claim 1, comprising 50 to 80 percent SnO.

5. The glass composition according to claim 1, comprising 15 to 30 percent $P_2O_5$.

6. The glass composition according to claim 1, comprising up to 30 percent iron oxide.

7. The glass composition according to claim 1, wherein the glass transition temperature of the glass is 400° C. or less.

8. The glass composition according to claim 7, wherein the glass transition temperature is in the range of from 270° C. to 370° C.

9. An article comprising the glass composition according to claim 1.

10. The article according to claim 9, wherein the article is an OLED, an optical component, a lighting device, a telecommunication device, a flat panel display device, or a liquid crystal display device.

11. A glass frit or sealing glass comprising the glass composition according to claim 1.

12. A glass composition comprising in mole percent:
    40 to 80 percent SnO;
    12 to less than 25 percent $P_2O_5$;
    0 to 15 percent ZnO; and
    1 to 40 percent iron oxide.

13. A glass composition consisting essentially of in mole percent:
    40 to 80 percent SnO;
    12 to less than 25 percent $P_2O_5$;
    0 to 15 percent ZnO; and
    greater than 0 to 40 percent metal oxide, wherein the metal oxide is selected from titanium oxide, vanadium oxide, iron oxide, niobium oxide, and combinations thereof.

14. A glass composition consisting essentially of in mole percent:
    40 to 80 percent SnO;
    12 to 35 percent $P_2O_5$;
    0 to 15 ZnO; and
    greater than 0 to 40 percent metal oxide, wherein the metal oxide is selected from titanium oxide, vanadium oxide, iron oxide, niobium oxide, and combinations thereof and
    wherein when ZnO is present in an amount of 6 percent or more, and when the metal oxide is titanium oxide, niobium oxide, or a combination thereof, then titanium oxide, niobium oxide, or a combination thereof is present in an amount greater than 5 percent.

15. A method of making the glass composition according to claim 1, the method comprising:
    combining batch materials, wherein the batch materials comprise oxides having reduced oxidation states; and
    melting the batch materials to form the glass composition.

16. A method of making the glass composition according to claim 12, the method comprising:
    combining batch materials, wherein the batch materials comprise oxides having reduced oxidation states; and
    melting the batch materials to form the glass composition.

* * * * *